(12) United States Patent
Tailor et al.

(10) Patent No.: US 10,491,352 B1
(45) Date of Patent: Nov. 26, 2019

(54) CONFIGURING REFERENCE-SIGNAL TRANSMISSION IN A WIRELESS COMMUNICATION SYSTEM BASED ON AZIMUTHS AND DISTANCES

(71) Applicant: Sprint Spectrum L.P., Overland Park, KS (US)

(72) Inventors: Pinalkumari Tailor, Ashburn, VA (US); Yun Sung Kim, Ashburn, VA (US); Dennis Canoy, Ashburn, VA (US); Sandeep Mangrulkar, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 424 days.

(21) Appl. No.: 15/336,268

(22) Filed: Oct. 27, 2016

(51) Int. Cl.
*H04L 12/26* (2006.01)
*H04L 5/00* (2006.01)
*H04W 16/24* (2009.01)
*H04B 17/345* (2015.01)
*H04W 24/02* (2009.01)

(52) U.S. Cl.
CPC .............. *H04L 5/005* (2013.01); *H04W 16/24* (2013.01); *H04B 17/345* (2015.01); *H04W 24/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0129987 | A1* | 7/2003 | Tanay | H04W 16/18 455/450 |
| 2004/0185864 | A1* | 9/2004 | Balachandran | H04W 28/22 455/452.2 |
| 2013/0217401 | A1* | 8/2013 | Edge | G01S 5/0226 455/450 |
| 2013/0235807 | A1* | 9/2013 | Lee | H04W 16/28 370/329 |
| 2014/0162682 | A1* | 6/2014 | Tafreshi | H04W 24/02 455/456.1 |
| 2014/0243007 | A1* | 8/2014 | Campos | H04W 28/0289 455/453 |
| 2015/0319611 | A1 | 11/2015 | Garcia | |
| 2016/0337952 | A1* | 11/2016 | Li | H04W 48/16 |
| 2017/0318516 | A1* | 11/2017 | Huang | H04W 36/0083 |

* cited by examiner

*Primary Examiner* — Abdelillah Elmejjarmi (57) ABSTRACT

A method and system to help provide efficient configuration of reference signal transmission in a wireless communication system. A processing system evaluates the configurations of various sectors within a region, taking into account distances between the sectors and azimuths of the sectors, to determine for at least one sector an aggregate interference score with respect to one or more nearby sectors having the same reference signal as the sector. And based on the aggregate interference score, the processing system may then reconfigure reference signal transmission of the sector, such as by changing the reference signal configuration of the sector for instance. Further, the processing system may iteratively repeat this process for numerous sectors within a region, to help optimize reference signal configurations throughout the region.

18 Claims, 6 Drawing Sheets

CONFIGURING REFERENCE-SIGNAL TRANSMISSION IN A WIRELESS COMMUNICATION SYSTEM BASED ON AZIMUTHS AND DISTANCES

BACKGROUND

A typical wireless communication network includes a number of base stations each radiating to provide one or more coverage areas or "sectors" in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a WCD within coverage of the network may engage in air interface communication with a base station and may thereby communicate via the base station with various remote network entities or with other WCDs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1xRTT and 1xEV-DO), Global System for Mobile Communications (GSM), IEEE 802.11 (WIFI), and BLUETOOTH. Each protocol may define its own procedures for registration of WCDs, initiation of communications, handover between sectors, and other functions.

Further, each sector may provide wireless service to WCDs on one or more carrier frequencies, with the air interface defining various downlink and uplink channels. For instance, on the downlink (in the direction from the base station to WCDs), the air interface may define a reference channel for carrying a reference signal that WCDs can measure to evaluate base station coverage strength, the air interface may define various other downlink control channels for carrying control signaling to WCDs, and the air interface may define one or more downlink traffic channels for carrying bearer data and other information to WCDs. And on the uplink (in the direction from WCDs to the base station), the air interface may define an access channel for carrying WCD access requests to the base station, the air interface may define one or more other uplink control channels for carrying control signaling to the base station, and the air interface may define one or more uplink traffic channels for carrying bearer data and other information to the base station.

When a WCD initially enters into coverage of such a system, the WCD may scan for a strongest sector in which to operate, and the WCD may then engage in signaling with base station that provides that sector, to register for service with the network. The WCD may then be served by the network a connected mode in which the WCD has an established radio-link-layer connection in that sector and the WCD and base station may exchange bearer data (e.g., application-layer communications), or in an idle mode in which the WCD does not have an established radio-link-layer connection in that sector but the WCD monitors the sector for page messages and may engage in signaling with the base station to transition to the connected mode.

When so served, the WCD may also regularly monitor coverage strength of its serving sector and of other sectors that extend to the WCD's location, to help ensure that the WCD is served with sufficiently strong coverage and perhaps with the strongest available coverage. If the WCD's coverage of its serving sector becomes threshold weak and if coverage of another sector becomes threshold strong (e.g., threshold stronger than the serving sector's coverage or than a defined level), then the WCD may then hand over to the other sector (e.g., through signaling with its serving base station, or autonomously).

OVERVIEW

In an optimal wireless communication network, the reference signal provided respectively by each of various sectors would be physically distinct from the reference signals provided by any other sectors in the vicinity, so that WCDs can evaluate coverage on a per sector basis. While transmissions from sectors in the vicinity may contribute to the overall noise floor, having physically distinct reference signals per sector may at least enable WCDs to evaluate signal-to-noise ratio in a given sector, to help the WCD gauge whether to operate in that particular.

Interference between reference signal transmissions of nearby sectors can be minimized or avoided by implementing different air interface configurations for reference signal transmission in the sectors, such as by having the sectors provide their reference signals at different times than each other and/or on different frequencies than each other. Specifics of such reference signal configurations may vary based on the air interface protocol in use.

By way of example, under LTE, several different reference signal configurations are defined as mutually exclusive recurring patterns of frequency-time resources.

In particular, a typical LTE air interface spans a particular carrier frequency bandwidth, such as 5 MHz, 10 MHz, or 15 MHz for instance, divided into a continuum of 10-millisecond frames, with each frame divided into ten 1-millisecond subframes, and each subframe then divided over time into 0.67 microsecond symbol segments and divided over the frequency bandwidth into 15 kHz subcarriers. Each subframe thus defines a grid or array of resource elements, with each resource element spanning a 0.67 microsecond segment of time and occupying a 15 kHz subcarrier. And each resource element is adapted to carry a communication signal modulated on its subcarrier. LTE then defines three distinct reference signal configurations as mutually exclusive patterns of these resource elements on a per subframe basis, namely, as particular resource elements distributed throughout the frequency-time grid per subframe. And each LTE sector is configured to use one of these three reference signals configurations and to broadcast its reference signal in the resource elements of the configuration.

According to LTE, each sector (referred to as a "cell" in LTE parlance) broadcasts information that enables a WCD to find and evaluate the sector's reference signal.

In particular, each sector has an assigned primary synchronization signal (PSS) value and an assigned secondary synchronization signal (SSS) value, and the sector broadcasts these PSS and SSS values at the center of its frequency bandwidth every five subframes. These PSS and SSS broadcasts enable a WCD to establish time synchronization with the sector based on a priori knowledge of where the PSS and SSS lie within an LTE frame.

Further, a modulo 3 (MOD 3) function of a sector's PSS value produces a result of 0, 1, or 2, with each of these results corresponding respectively with one of three predefined reference signal configurations. Namely, a MOD 3 result of 0 corresponds with a standard baseline reference signal configuration defining a particular distribution of resource elements per subframe, a MOD 3 result of 1 corresponds with the baseline reference signal configuration fully shifted one subcarrier higher, and a MOD 3 result of 2 corresponds with the baseline reference signal configuration shifted two subcarriers higher. (In other LTE implementations, or under other protocols, it may of course be feasible to define some other quantity N of reference signal configurations, such as by using a different modulo operation, or in another manner.)

Still further, a predefined mathematical combination of the PSS and SSS values also produces a physical cell identity (PCI) value for the sector, which serves as an identifier of the sector for various purposes. And the PCI is used for coding a reference signal that the sector then broadcasts in the resource elements of the sector's reference signal configuration.

Thus, with this arrangement, every sector in an LTE network could have one of three reference signal configurations and could have a PCI that forms the basis for coding of the sector's reference signal. When a WCD is scanning for coverage, the WCD could thus establish synchronization with a sector, determine the sector's reference signal configuration based on the sector's PSS, and evaluate strength (e.g., signal-to-noise ratio) of the sector's reference signal coded with the sector's PCI and broadcast in the resource elements of the sector's reference signal configuration.

If nearby sectors have the same reference signal configuration as each other (e.g., broadcast their reference signals at the same time as each other and on the same frequency as each other), there is a risk of inter-sector reference signal interference. Consequently, it would be beneficial to lay out a network of sectors such that nearby sectors do not have the same reference signal configuration as each other.

With an LTE arrangement as described above, or with other arrangements, however, there may be a limited number of reference signal configurations. Thus, it may be difficult from an engineering perspective to configure nearby sectors to use different reference signal configurations. Further, this task would become increasing difficult when changes in network configuration occur, such as when a wireless service provider adds new sectors (e.g., adds new base stations) or changes base station configurations. Such changes in network configuration may necessitate extensive, time-consuming engineering effort to help ensure that the reference signals of nearby sectors do not unduly interfere with each other.

Disclosed herein is a method and system to help provide efficient configuration of reference signal transmission in a wireless communication system. In accordance with the disclosure, a processing system will automatically evaluate the configurations of various sectors within a region, taking into account distances between the sectors and azimuths of the sectors, to determine for at least one sector an aggregate interference score with respect to one or more nearby sectors having the same reference signal as the sector. And based on the aggregate interference score, the processing system may then reconfigure reference signal transmission of the sector, such as by changing the reference signal configuration of the sector for instance. Further, the processing system may iteratively repeat this process for numerous sectors within a region, to help optimize reference signal configurations throughout the region.

Accordingly, in one respect, disclosed is a method for configuring reference-signal transmission in a wireless communication system, where the wireless communication system includes a plurality of sectors, each sector having one of N distinct reference signal configurations, where N is at least 3, and each sector having an origin location (e.g., base station antenna structure location) and having an azimuth defining a direction of radiation from the origin location.

In accordance with the method, the processing system computes an aggregate interference score associated with a given sector of the plurality of sectors, including (i) identifying k sectors nearest to the given sector that have the same reference signal configuration as the given sector, where k is at least 2, (ii) for each identified sector, computing a sector-based interference score based at least on a distance between the origin locations of the given sector and the identified sector, a degree to which the azimuth of the given sector is angled away from the origin location of the identified sector, and a degree to which the azimuth of the identified sector is angled away from the origin location of the given sector, and (iii) summing the computed sector-based interference scores for the k identified sectors. Further, the processing system determines if the computed aggregate interference score is higher than a predefined threshold interference score and (a) if so, then the processing system changes the reference signal configuration of the given sector but (b) if not, then the computing system maintains the reference signal configuration of the given sector.

In another respect, disclosed is another method for configuring reference-signal transmission in a wireless communication system, where the wireless communication system includes a plurality of cell sites each providing N directional sectors of coverage, where N is at least 3, where each sector in the system is configured to broadcast a reference signal using one of N distinct reference signal configurations, and where each sector has an origin location and has an azimuth defining a direction of radiation from the origin location. The method then applies for a given cell site of the plurality of cell sites.

In accordance with the disclosure, the method includes computing a cumulative interference score respectively for each permutation of the N reference signals among the N sectors of the cell site, where computing the cumulative interference score for a given permutation comprises computing for each sector of the cell site an aggregate interference score and computing as the cumulative interference score a sum of the aggregate interference scores of the sectors of the cell site. Further, the method includes determining which permutation of the N reference signal configurations among the N sectors of the cell site has a lowest computed cumulative interference score among the permutations of the N reference signal configurations among the N sectors of the cell site. And the method includes configuring reference-signal transmission in the sectors of the cell site in accordance with the determined permutation of the N reference signal configurations among the N sectors of the cell site.

Moreover, in line with the discussion above, the act of computing the aggregate interference score for each given sector of the cell site in this method includes (i) identifying k sectors nearest to the given sector that have the same reference signal configuration as the given sector, where k is at least 2, (ii) for each identified sector, computing a sector-based interference score based at least on a distance between the origin locations of the given sector and the identified sector, a degree to which the azimuth of the given sector is angled away from the origin location of the identified sector, and a degree to which the azimuth of the identified sector is angled away from the origin location of the given sector, and (iii) summing the computed interference scores for the k identified sectors.

Still further, the disclosed processing system can be configured for implementation in a computing system such as a network server within a wireless communication network, and/or integrated with one or more other network elements, such as one or more base stations or the like. And the disclosed method features can be carried out by the processing system implementing program instructions, which could be embodied on a non-transitory machine readable medium.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network with a configuration like that described above. It will be understood, however, that principles of the disclosure can extend to apply in other scenarios as well, such as with different LTE configurations (e.g., allowing for a different number N of reference signal configurations, for instance), or with other air interface protocols altogether. More generally, elements, arrangements, and operations may be added, removed, combined, distributed, re-ordered, or otherwise modified. In addition, it will be understood that operations described as being performed by one or more entities may be implemented in various ways, such as by one or more processing units executing program instructions for instance.

Figure 1:
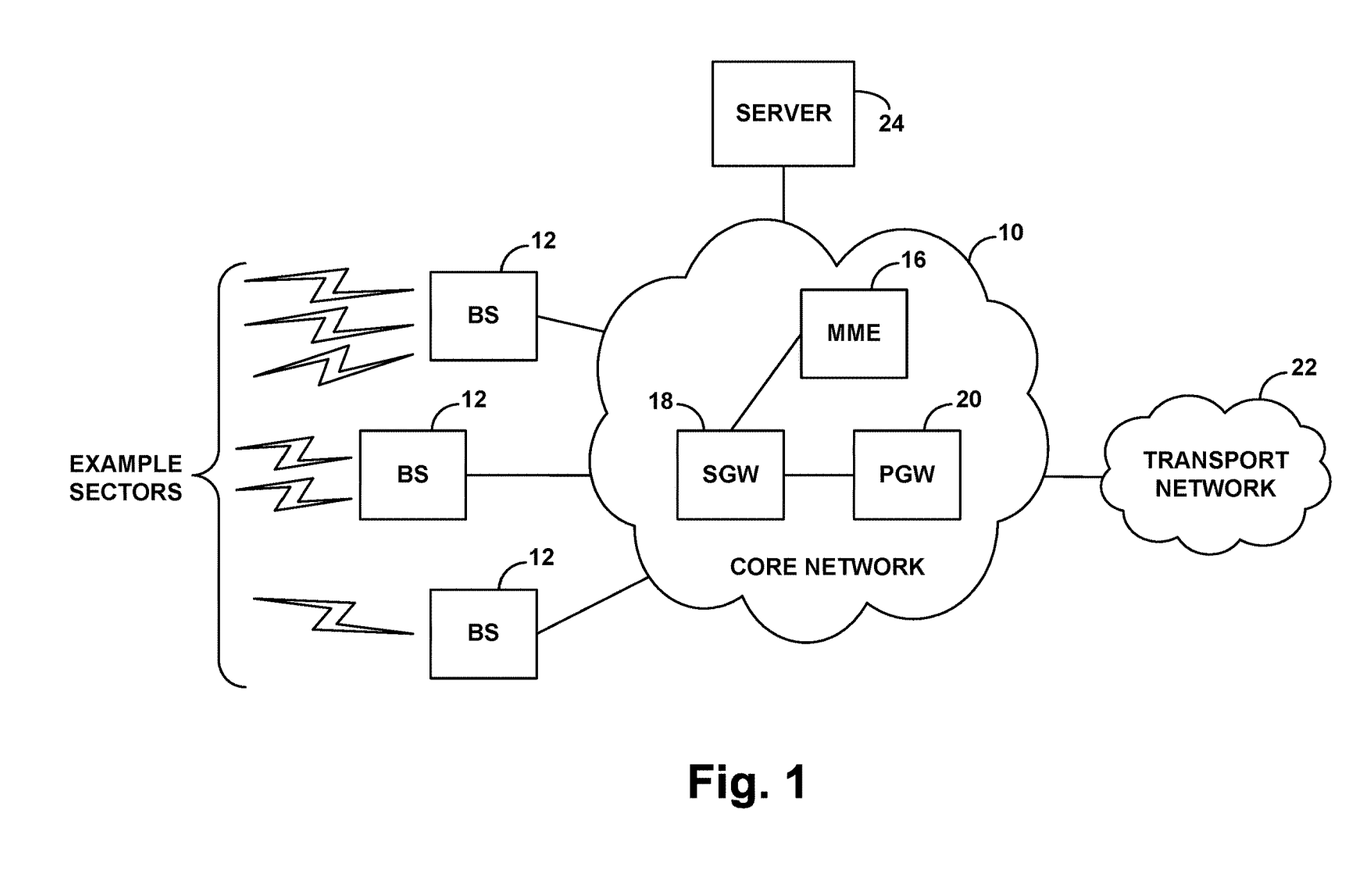
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve WCDs with wireless packet data communication service, including possibly voice-over-packet service, but may also provide other functions. The LTE network may be implemented by a wireless service provider. As shown, the LTE network includes a core network 10 (or "evolved packet core (EPC)) could be a packet-switched network, compliant with the industry standard system architecture evolution (SAE) for the LTE protocol, and thus the entities shown on the core network could each have an IP address and be configured to communicate with each other over packet-based tunnels or other communication interfaces, some of which could be dynamically configured as needed to serve individual WCDs for instance.

As shown, sitting on the core network 10 are by way of example several LTE base stations 12, referred to as evolved-Node-B's (eNodeBs), as well as a mobility management entity (MME) 16, a serving gateway (SGW) 18, and a packet data network (PDN) gateway (PGW) 20, with the PGW then providing connectivity with a packet-switched transport network 22 such as the Internet. In addition, shown on the core network 10 is a representative computer server 24, which could operate as a processing system in an example implementation to carry out various features of the present disclosure.

As shown, each of the eNodeBs 12 is configured to provide one or more wireless coverage areas (sectors) in which the eNodeB can serve WCDs. As such, each eNodeB could take various forms. For instance, an eNodeB could be a macro eNodeB of the type typically including a tower-mounted antenna structure or the like and providing a broad range of coverage. Or an eNodeB could be a small-cell, femtocell, or picocell eNodeB or the like of the type typically having a smaller form factor and providing a narrower range of coverage. Further, each eNodeB could be communicatively linked with the core network by a landline connection and/or by a wired connection such as a wireless relay backhaul connection.

In practice, each eNodeB would include one or more antennas and associated equipment, such as a radio-frequency transceiver and a power amplifier, for radiating to provide each of the eNodeB's one or more sectors of coverage. Each sector in the system may thus have an origin point as a geographic location where the eNodeB's antenna structure is positioned and from which the sector's coverage emanates. Further, each sector would thus have a particular antenna pattern or area of coverage in which to serve WCDs. And each sector would have an azimuth, defining a direction of radiation from the sector's origin location, characterized by an angle of rotation around a vertical axis, possibly in relation to North (zero degrees) for instance, as well as a beamwidth of coverage. The azimuth of the sector could be configured by mechanical rotation of the eNodeB or of its antenna structure, or by controlling phase, amplitude, and/or other attributes of various phased array antenna elements or the like.

With this arrangement, each eNodeB at a physical location may define a cell site at that location, and the cell site may provide one or more sectors of coverage. By way of example, an eNodeB may be configured with an antenna structure and associated equipment to provide three directional sectors of coverage, having azimuths spaced 120 degrees from each other. Alternatively an eNodeB may be configured with an antenna structure and associated equipment to provide a lesser or greater number of sectors, still with each sector having an origin location and having an azimuth defining a direction of radiation from the origin location.

Figure 2:
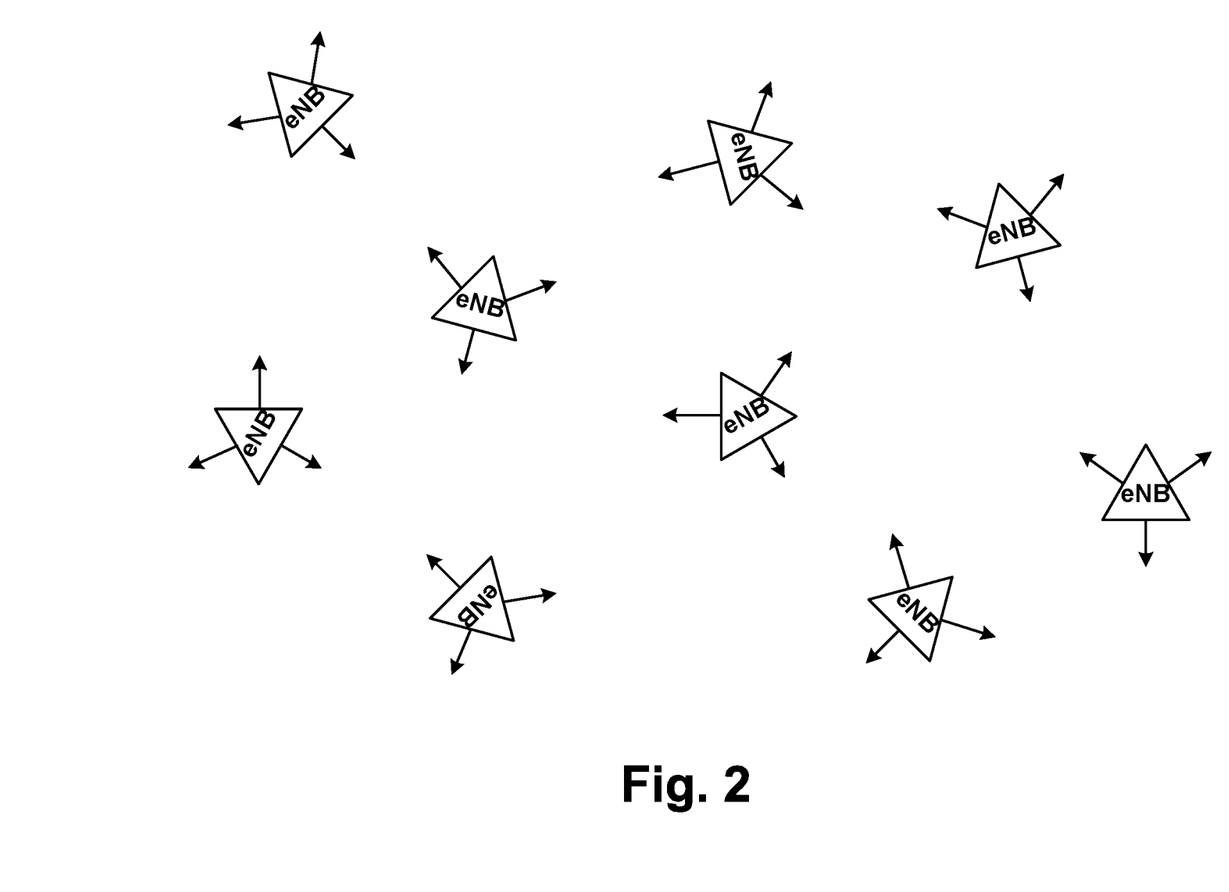
FIG. 2 depicts an example region of a wireless communication system including a plurality of cell sites.
Figure 3:
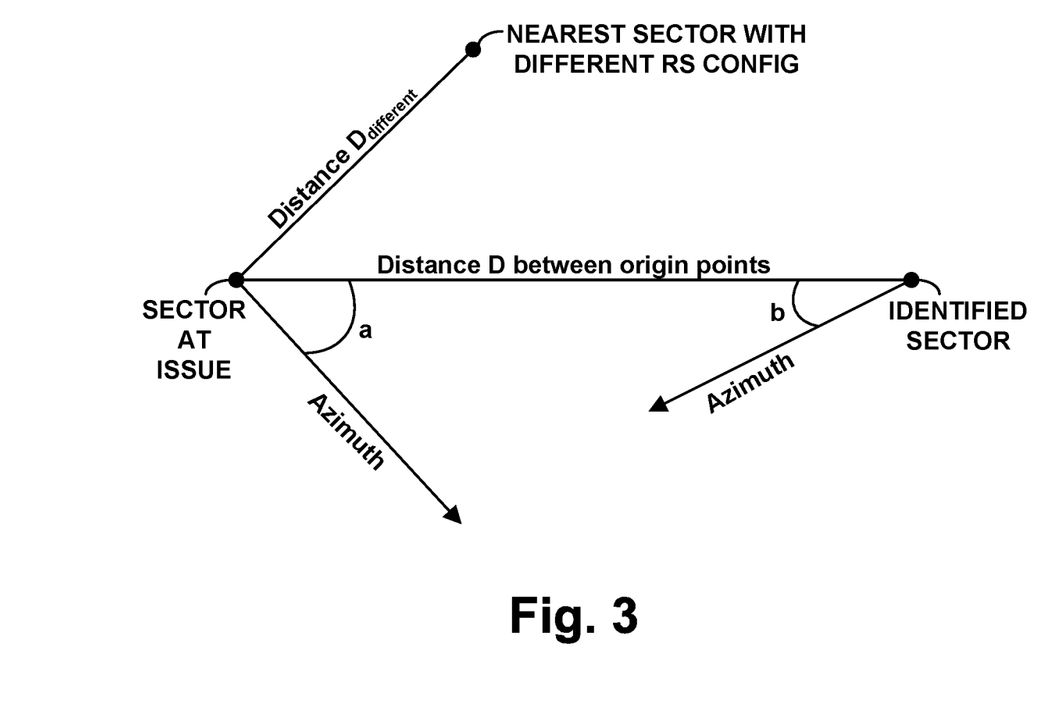
FIG. 3 depicts example sectors at a distance from each other and having respective azimuths.

FIG. 2 depicts an example region of the wireless communication system, in which a plurality of eNodeBs each define a respective cell site and each provide three representative directional sectors having respective origin locations and azimuths. In practice, a wireless service provide may put these eNodeBs in service throughout the region to help provide good coverage throughout the region and to facilitate seamless handover of served WCDs between sectors. In the figure, each eNodeB is represented by a triangle, with arrows pointing in directions representing the azimuths of the eNodeB's sectors.

In a representative LTE implementation, we can assume that all of the illustrated sectors in this region operate on the same carrier frequency as each other, but that each sector has a respective PCI, which is indicated by the sector's PSS and SSS values. Further, in each sector, the eNodeB providing the sector broadcasts a reference signal using a reference signal configuration indicated by a MOD 3 function of the sector's PSS value. In particular, with this arrangement as discussed above, there are three mutually exclusive reference signal configurations corresponding respectively with MOD 3 values 0, 1, and 2, each being a particular recurring pattern of resource elements.

In an LTE implementation where each cell site has three sectors, the wireless service provider may configure the three sectors of each cell site with PSS values (or PCI values) that provide different MOD 3 values than each other, so that the reference signal configurations of the three sectors will not overlap with each other.

At issue, however, is how to best distribute the reference signal configurations among the sectors of a cell site, considering the potential for reference signal interference with nearby sectors. Further, even in an implementation where a cell site defines just a single sector or perhaps just two sectors, at issue is what reference signal configuration to use in each such sector, considering the potential for reference signal interference with nearby sectors. These issues may arise when a wireless service provider changes network configuration by adding, removing, or restructuring eNodeBs in the region. Further, it may be useful to periodically evaluate network configuration to help ensure optimal reference signal configuration in the sectors.

In accordance with the present disclosure, a processing system will be provided with or have access to sector data regarding the physical configuration of each sector within a region such as that shown in FIG. 2. This sector data could include various attributes, such as the origin location of the sector, the azimuth of the sector, and, if applicable, a current PSS (or PCI) value of the sector, an associated MOD 3 value of the sector, and/or another indication of which reference signal configuration the sector has. In practice, as a wireless service provider puts eNodeBs into service or changes configuration of eNodeBs in the system, the wireless service provider can record or update this sector data in a central data store within the core network for instance, and a processing system such as server 24 can be provided with access to the data.

In accordance with the present method, the processing system will evaluate the relative configuration of various sectors with the system, taking into consideration the distance between the sectors and the azimuths of the sectors, as a basis to establish for each of one or more sectors a reference signal interference score or index. And the processing system will use the established reference signal interference score as a basis to decide what the reference signal configuration of the sector should be.

To the extent the decision is to change the reference signal configuration of the sector, the processing system will then implement that configuration change, such as by signaling to the eNodeB that provides the sector to cause the eNodeB to make the change. In particular, the result may be to change the PSS (and thus PCI) of the sector so as to change the sector's associated MOD 3 value and to thereby cause the sector to use a different reference signal configuration that could optimally help reduce inter-sector reference signal interference. In practice, the processing system could transmit to the eNodeB at issue a control message identifying the sector at issue and specifying the change to be made, and the eNodeB may receive that control message and responsively implement the change, such as by changing its PCI (e.g., changing its PSS and/or SSS) and accordingly changing its reference signal configuration.

In practice, a goal of the processing system when evaluating a sector in this process is to predict an extent to which there will be inter-sector reference signal interference between the sector and one or more other sectors that have the same reference signal configuration as the sector. Although the PCIs of those sectors would optimally be different and thus their coded reference signals would differ from each other, their use of the same reference signal configuration could create an interference issues, contributing to the noise that a WCD would face when trying to evaluate the reference signal from the sector at issue.

To facilitate this analysis for a given sector, the processing system may focus its analysis on the nearest k sectors that have the same reference signal configuration as the given sector. In particular, the processing system may determine the reference signal configuration of the sector at issue (or, if such a configuration is not yet established, may assume such a configuration to predict an interference level) and may filter the sector data to produce a set limited to those sectors in the system that have the same reference signal configuration as the sector at issue. Further, the processing system may rank order the resulting set of sectors in order of distances between their origin locations and the origin location of the sector at issue. And the processing system may then select the k sectors rank ordered with the shortest distance, as those closest to the sector at issue. For this purpose, the value k could be 4 or could be another designated value.

The processing system may then compute an aggregate interference score for the sector at issue, to use as a basis for deciding whether to change the reference signal configuration of the sector at issue. To compute this aggregate interference score, the processing system may compute a sector-based interference score with respect to each of the identified k sectors and may sum those sector-based interference scores.

Optimally, the sector-based interference score for each of the identified k sectors could be keyed to distance between the distance between the origin location of the sector at issue and the origin location of the identified sector, and could further be keyed to the degree to which the azimuth of the sector at issue points away from the origin location of the identified sector and the degree to which the azimuth of the identified sector points away from the origin location of the sector at issue.

For example, the processing system could compute a distance between the origin locations of the sector at issue and the identified sector, the processing system could compute a first angle between the azimuth of the sector at issue and a line extending between the points of origin of the sector at issue and the identified sector, and the processing system could compute a second angle between the azimuth of the identified sector and the line extending between the points of origin of the sector at issue and the identified sector. And the processing system could then factor these distance and angle values into a denominator of a function defining the sector-based interference score. That way, the computed sector-based interference score could be inversely related to each of these values.

Further, the sector-based interference score could also take into account the distance between the origin location of the sector at issue and the origin location of a nearest other sector (not co-located, i.e., not co-originated) that has a different reference signal configuration than the sector at issue. The theory here is that, if that nearby sector is close enough, there could be dominant interference between the reference signal of the sector at issue and other transmissions (e.g., shared channel transmissions) of the nearby sector. That dominant interference could render inter-sector reference signal interference less relevant or less a basis for changing reference signal configuration.

To account for this, the processing system could filter the sector-data to identify sectors that have a different reference signal configuration than the current sector and could compare origin locations to identify the one such sector whose origin location is closest to the origin location of the sector at issue. And the processing system could then factor into the sector-based interference score (and thus ultimately the aggregate interference score for the sector at issue) the distance between the origin locations of the sector at issue and that closest sector having the different reference signal configuration, such as by factoring the distance into a numerator of the sector-based interference score, or into the denominator of a ratio within the denominator of the sector-based interference score. That way, the computed sector-based interference score could be directly related (rather than inversely related) to this distance.

(Further, the processing system could similarly take into account the angle between the azimuth of this nearest sector having the different reference signal configuration and a line extending between the points of origin of the sector at issue and that nearest sector, such as by making the sector-based interference score directly related to that angle as well.)

The following is one of numerous possible examples of equations that the processing system could use in line with this discussion, to compute an aggregate interference score for a given sector at issue, as a sum of sector-based interference scores for the k identified nearest sectors that have the same reference signal configuration as the given sector:

$$IntScore = \sum_{n=1}^{k} \left( \frac{1}{(|a_n| + |b_n| + |a_n + b_n|) \times \left(\frac{D_n}{D_{different}}\right)^2} \times 100 \right)$$

Here, $a_n$ is the angle between the azimuth of the given sector and the line connecting the origin locations of the given sector and the identified sector; $b_n$ is the angle between the azimuth of the identified sector and the line connecting the origin locations of the given sector and the identified sector; $D_n$ is the distance between the origin location of the given sector and the origin location of the identified sector; and $D_{different}$ is the distance between the origin location of the given sector and the origin location of the nearest sector that has a different reference signal configuration than the given sector. Notice that in this example equation, the absolute values of the angles $a_n$ and $b_n$ and of their sum is used. This accounts for the magnitude of the angles regardless of their signs.

In practice, the processing system could compute an aggregated interference score in this or a similar manner for each sector within a region, possibly periodically or in response to the occurrence of changes in network configuration.

For any such sector as to which the processing system conducts this process, the processing system could compare the aggregated interference score computed for the sector with a predefined threshold interference score to determine whether the aggregate interference score for the sector is threshold high. Here, the predefined threshold interference score could be set by engineering design to a level that would be deemed sufficiently high to be problematic in terms of network operation and user experience.

And if the processing system thus determines that the aggregate interference score for the sector is threshold high, then the processing system may responsively change the reference signal configuration of the sector, such as by signaling to the eNodeB at issue to direct the eNodeB to make the change. For instance, the processing system could conduct the same interference score analysis for a hypothetical other reference signal configuration of the sector at issue and, in response to determining the aggregate interference score would be lower, could direct the eNodeB to reconfigure the sector to use that other reference signal configuration instead. Whereas, if the processing system determines that the aggregate interference score for the sector is not threshold high, then the processing system may responsively maintain the reference signal configuration of the sector, by not responsively directing a change in the sector's reference signal configuration.

Further, in another implementation, the processing system could evaluate each of one or more cell sites within the system, using a similar process, to determine what an optimal permutation of reference signal configurations would be among the sectors of the cell site, and the processing system could then configure the cell site to put that permutation into effect among the sectors of the cell site if the permutation is not already in effect. Moreover, the processing system could repeat this process iteratively as well, to help optimize reference signal configuration throughout the system.

In particular, a representative cell site in the system, the processing system could test out each of various permutations of reference signal configurations among the sectors, computing a cumulative interference score as a total of the aggregated interference score for each sector of the cell site in the permutation under test. For example, if the cell site has three sectors A, B, and C and there are three possible reference signal configurations 0, 1, and 2, the processing system could compute a cumulative interference score for the permutations {A:0, B:1, C:2}, {A:0, B:2, C:1}, {A:1, B:0, C:2}, {A:1, B:2, C:0}, {A:2, B:1, C:0}, and {A:2, B:0, C:1}. For each such permutation, the processing system could compute an aggregate interference score for each sector of the cell site in the manner discussed above and could sum the three aggregate interference scores to establish a cumulative interference score for the cell site.

The processing system could then select the permutation for the cell site that resulted in the lowest computed cumulative interference score and could configure the cell site to have that permutation. Here again, for instance, the processing system could signal to the eNodeB of the cell site to direct the eNodeB to configure each sector in accordance with the selected permutation.

Figure 4:
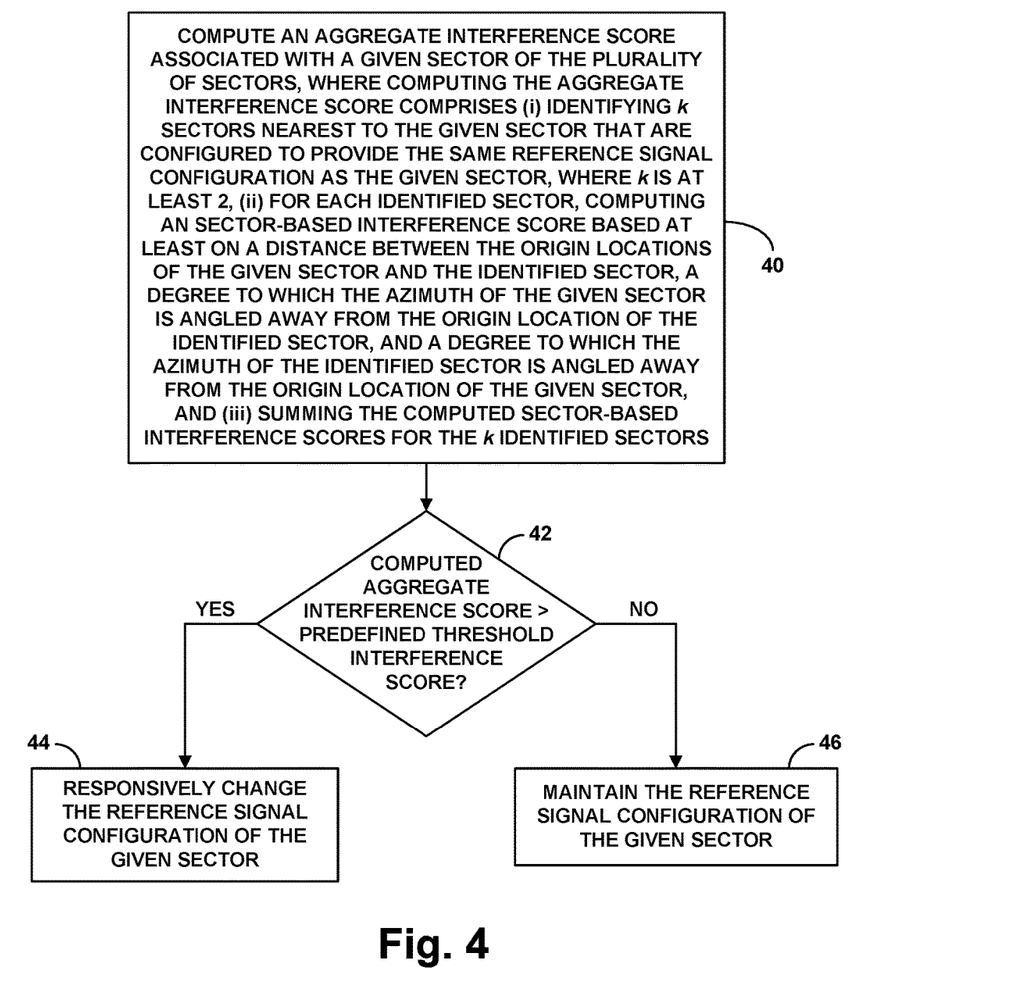
FIG. 4 is a flow chart depicting operations that can be carried out in accordance with the disclosure.

FIG. 4 is next a flow chart depicting a method that can be carried out in accordance with the present disclosure, for configuring reference-signal transmission in a wireless communication system, where the wireless communication system includes a plurality of sectors, each sector having one of N distinct reference signal configurations, where N is at least 3, and each sector having an origin location and having an azimuth defining a direction of radiation from the origin location. Features of the method can be carried out by a server as noted above, and/or by one or more other entities, possibly with some or all of the operations distributed at various base stations or other equipment within the system.

As shown in FIG. 4, at block 40, the method involves a processing system computing an aggregate interference score associated with a given sector of the plurality of sectors, where computing the aggregate interference score comprises (i) identifying k sectors nearest to the given sector that are configured to provide the same reference signal configuration as the given sector, where k is at least 2, (ii) for each identified sector, computing an sector-based interference score based at least on a distance between the origin locations of the given sector and the identified sector, a degree to which the azimuth of the given sector is angled away from the origin location of the identified sector, and a degree to which the azimuth of the identified sector is angled away from the origin location of the given sector, and (iii) summing the computed sector-based interference scores for the k identified sectors.

At block 42, the method then involves determining if the computed aggregate interference score is higher than a predefined threshold interference score. And if so, then at block 44, the method involves responsively changing the reference signal configuration of the given sector. Whereas if not, then at block 46, the method involves maintaining the reference signal configuration of the given sector.

As discussed above, each of the N distinct reference signal configurations could occupy a respective recurring pattern of time-frequency resources (e.g., LTE resource elements), with the N different reference signal configurations being mutually exclusive. Further, the reference signal configuration of each sector in the system could correspond with a modulo N function of a primary synchronization signal of the sector. Moreover, identifying the k sectors nearest to the given sector that have the same reference signal configuration as the given sector could be based on (i) a comparison of the reference signal configurations of the k sectors with the reference signal configuration of the given sector and (ii) a comparison of the origin locations of the k sectors with the origin location of the given sector.

In addition, as discussed above, for each identified sector (of the k identified sectors), (i) the computed sector-based interference score could be inversely related to the distance between the origin locations of the given sector and the identified sector, (ii) the computed sector-based interference score could be inversely related to the degree to which the azimuth of the given sector points away from the origin location of the identified sector, and (iii) the computed sector-based interference score could be inversely related to the degree to which the azimuth of the identified sector points away from the origin location of the given sector. For example, an equation like that discussed above could be used, or another equation could be used.

To facilitate this, the method could thus further involve determining the degree to which the azimuth of the given sector points away from the origin location of the identified sector, as an angle between (i) the azimuth of the given sector and (ii) a line connecting the origin locations of the given sector and the identified sector, and determining the degree to which the azimuth of the identified sector points away from the origin location of the given sector, as an angle between (i) the azimuth of the identified sector and (ii) the line connecting the origin locations of the given sector and the identified sector.

Further, as also discussed above, the act of computing the aggregate interference score (e.g., computing each sector-based interference score) could further be based on (e.g., directly related to) a distance between the origin location of the given sector and an origin location of a particular sector nearest to, but not co-located with, the given sector that has a different reference signal configuration than the given sector. And this could involve identifying the particular sector based on (i) a comparison of the reference signal configuration of the particular sector with the reference signal configuration of the given sector and (ii) a comparison of the origin location of the particular sector with the origin location of the given sector.

And as further discussed above, the act of changing the reference signal configuration of the given sector could involve transmitting to a base station of the given sector a control command to which the base station is configured to respond by changing the reference signal configuration of the given sector. Optimally, the change would be to a reference signal configuration that would have a lower computed aggregate interference score than the reference signal configuration that was subject to the above analysis.

Figure 5:
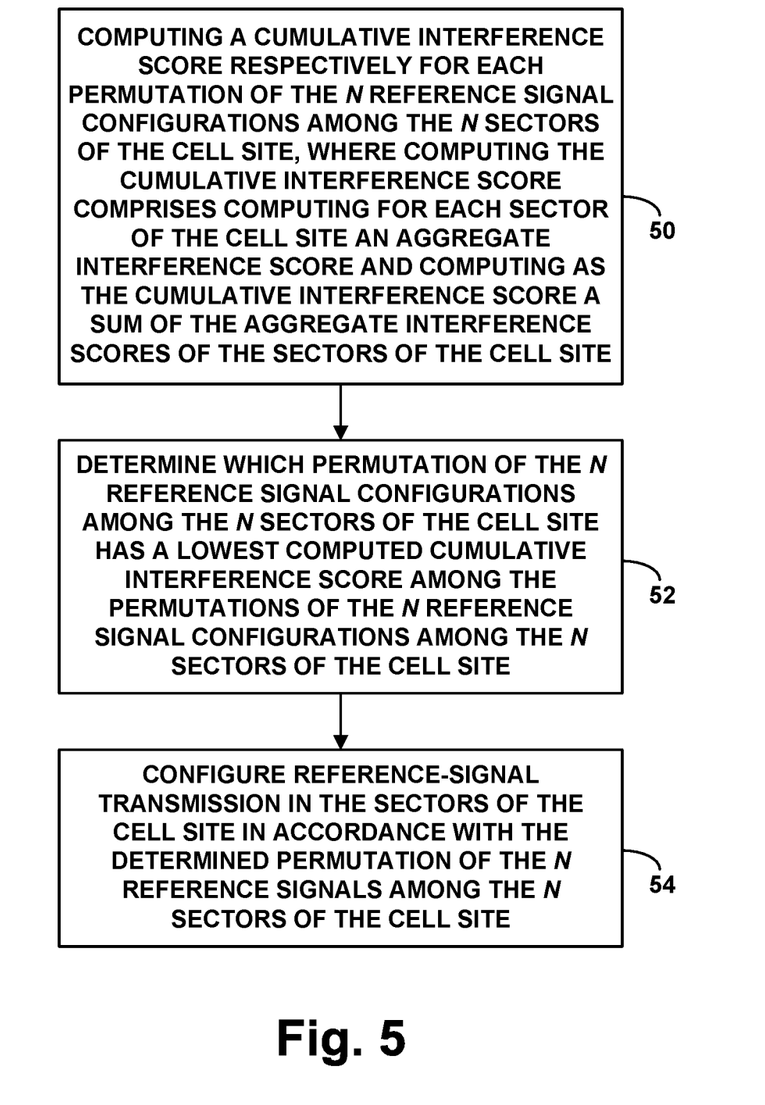
FIG. 5 is another flow chart depicting operations that can be carried out in accordance with the disclosure.

FIG. 5 is next another flow chart depicting a method for configuring reference-signal transmission in a wireless communication system, where the wireless communication system includes a plurality of cell sites each providing N directional sectors of coverage, where N is at least 3, where each sector in the system is configured to broadcast a reference signal using one of N distinct reference signal configurations, and where each sector has an origin location and has an azimuth defining a direction of radiation from the origin location. Here too, the method can be implemented by a server and/or one or more other entities. Further, the method can apply with respect to a cell site of the plurality of cell sites.

As shown in FIG. 5, at block 50, the method involves computing a cumulative interference score respectively for each permutation of the N reference signal configurations among the N sectors of the cell site, where computing the cumulative interference score comprises computing for each sector of the cell site an aggregate interference score and computing as the cumulative interference score a sum of the aggregate interference scores of the sectors of the cell site. At block 52, the method involves determining which permutation of the N reference signal configurations among the N sectors of the cell site has a lowest computed cumulative interference score among the permutations of the N reference signal configurations among the N sectors of the cell site.

And at block 54, the method involves configuring reference-signal transmission in the sectors of the cell site in accordance with the determined permutation of the N reference signals among the N sectors of the cell site. For instance, this can involve commanding a base station of the given sector to configure the reference-signal transmission in the sectors of the cell site to provide the determined permutation of the N reference signal configurations among the N sectors of the cell site if the determined permutation is not in effect already, or maintaining the permutation (and perhaps forgoing sending a command to the base station) if the determined permutation is already in effect.

In line with the discussion above, the act of computing the aggregate interference score for each given sector of the cell site could comprise (i) identifying k sectors nearest to the given sector that have the same reference signal configuration as the given sector, where k is at least 2, (ii) for each identified sector, computing a sector-based interference score based at least on a distance between the origin locations of the given sector and the identified sector, a degree to which the azimuth of the given sector is angled away from the origin location of the identified sector, and a degree to which the azimuth of the identified sector is angled away from the origin location of the given sector, and (iii) summing the computed sector-based interference scores for the k identified sectors.

Figure 6:
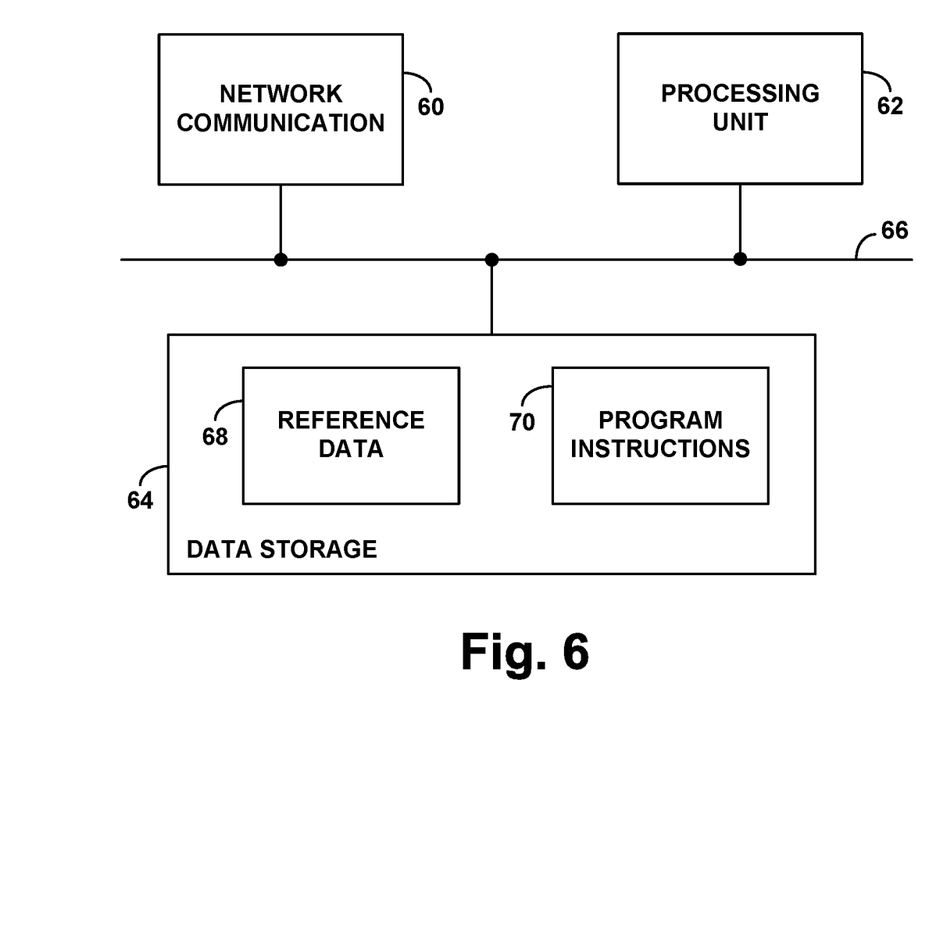
FIG. 6 is a simplified block diagram of a processing system operable in accordance with the disclosure.

Finally, FIG. 6 is a simplified block diagram of an example processing system configured to implement features such as those described above. As shown in FIG. 6, the processing system includes a network communication interface 60, a processing unit 62, and data storage 64, which could be integrated, distributed, or communicatively linked together by a system bus, network, or other mechanism 66.

In the example, the network communication interface 60 may include one or more landline or wireless communication modules to facilitate communication with other entities, such as to send reference signal configuration directives to base stations. The processing unit 62 may then comprise one or more general purpose processors (e.g., microprocessors) and/or one or more special-purpose processors (e.g., application specific integrated circuits). And the data storage 64 may comprise one or more volatile and/or non-volatile storage components (non-transitory) such as magnetic, optical, or flash storage.

As shown, the data storage 64 may then hold reference data 68, which could include the sector-data noted above, and the data storage could further hold program instructions 70, which could be executable by the processing unit 62 to carry out various features as described above.

Exemplary embodiments have been described above. Those skilled in the art will understand, however, that changes and modifications may be made to these embodiments without departing from the true scope and spirit of the invention.

What is claimed is:

1. A method for configuring reference-signal transmission in a wireless communication system, wherein the wireless communication system includes a plurality of sectors, each sector having one of N distinct reference signal configurations, wherein N is at least 3, and each sector having an origin location and having an azimuth defining a direction of radiation from the origin location, the method comprising:
   computing, by a processing system, an aggregate interference score associated with a given sector of the plurality of sectors, wherein computing the aggregate interference score comprises (i) identifying k sectors nearest to the given sector that are configured to provide the same reference signal configuration as the given sector, wherein k is at least 2, and wherein identifying the k sectors nearest to the given sector that have the same reference signal configuration as the given sector is based on a comparison of the reference signal configurations of the k sectors with the reference signal configuration of the given sector and a comparison of the origin locations of the k sectors with the origin location of the given sector, (ii) for each identified sector, computing a sector-based interference score based at least on a distance between the origin locations of the given sector and the identified sector, a degree to which the azimuth of the given sector is angled away from the origin location of the identified sector, and a degree to which the azimuth of the identified sector is angled away from the origin location of the given sector, and (iii) summing the computed sector-based interference scores for the k identified sectors; and
   determining if the computed aggregate interference score is higher than a predefined threshold interference score and (a) if so, then changing the reference signal configuration of the given sector and (b) if not, then maintaining the reference signal configuration of the given sector.

2. The method of claim 1, wherein each of the N distinct reference signal configurations occupies a respective recurring pattern of time-frequency resources, wherein the N different reference signal configurations are mutually exclusive.

3. The method of claim 1, wherein the reference signal configuration of each sector in the system corresponds with a modulo N function of a primary synchronization signal of the sector.

4. The method of claim 1, wherein, for each identified sector, the computed sector-based interference score is inversely related to the distance between the origin locations of the given sector and the identified sector, the computed sector-based interference score is inversely related to the degree to which the azimuth of the given sector points away from the origin location of the identified sector, and the computed sector-based interference score is inversely related to the degree to which the azimuth of the identified sector points away from the origin location of the given sector.

5. The method of claim 1, further comprising, for each identified sector: determining the degree to which the azimuth of the given sector points away from the origin location of the identified sector, as an angle between (i) the azimuth of the given sector and (ii) a line connecting the origin locations of the given sector and the identified sector; and determining the degree to which the azimuth of the identified sector points away from the origin location of the given sector, as an angle between (i) the azimuth of the identified sector and (ii) the line connecting the origin locations of the given sector and the identified sector.

6. The method of claim 5, wherein computing the aggregate interference score is further based on a distance between the origin location of the given sector and an origin location of a particular sector nearest to, but not co-located with, the given sector that has a different reference signal configuration than the given sector.

7. The method of claim 6, further comprising identifying the particular sector based on (i) a comparison of the reference signal configuration of the particular sector with the reference signal configuration of the given sector and (ii) a comparison of the origin location of the particular sector with the origin location of the given sector.

8. The method of claim 6, wherein the computed aggregate interference score is directly related to the distance between the origin location of the given sector and the origin location of the particular sector.

9. The method of claim 1, wherein changing the reference signal configuration of the given sector comprises transmitting to a base station of the given sector a control command to which the base station is configured to respond by changing the reference signal configuration of the given sector.

10. A method for configuring reference-signal transmission in a wireless communication system, wherein the wireless communication system includes a plurality of cell sites each providing N directional sectors of coverage, wherein N is at least 3, wherein each sector in the system is configured to broadcast a reference signal using one of N distinct reference signal configurations, and wherein each sector has an origin location and has an azimuth defining a direction of radiation from the origin location, the method comprising, for a cell site of the plurality of cell sites:

computing a cumulative interference score respectively for each permutation of the N reference signal configurations among the N sectors of the cell site, wherein computing the cumulative interference score comprises computing for each sector of the cell site an aggregate interference score and computing as the cumulative interference score a sum of the aggregate interference scores of the sectors of the cell site;

determining which permutation of the N reference signal configurations among the N sectors of the cell site has a lowest computed cumulative interference score among the permutations of the N reference signal configurations among the N sectors of the cell site; and configuring reference-signal transmission in the sectors of the cell site in accordance with the determined permutation of the N reference signals among the N sectors of the cell site, wherein computing the aggregate interference score for each given sector of the cell site comprises (i) identifying k sectors nearest to the given sector that have the same reference signal configuration as the given sector, wherein k is at least 2, and wherein identifying the k sectors nearest to the given sector that have the same reference signal configuration as the given sector is based on a comparison of the reference signal configurations of the k sectors with the reference signal configuration of the given sector and a comparison of the origin locations of the k sectors with the origin location of the given sector, (ii) for each identified sector, computing a sector-based interference score based at least on a distance between the origin locations of the given sector and the identified sector, a degree to which the azimuth of the given sector is angled away from the origin location of the identified sector, and a degree to which the azimuth of the identified sector is angled away from the origin location of the given sector, and (iii) summing the computed sector-based interference scores for the k identified sectors.

11. The method of claim 10, wherein the reference signal configuration of each sector occupies a respective recurring pattern of time-frequency resources, wherein the N different reference signal configurations are mutually exclusive.

12. The method of claim 10, wherein the reference signal configuration of each sector in the system corresponds with a modulo N function of a primary synchronization signal of the sector.

13. The method of claim 10, wherein, for each identified sector, the computed sector-based interference score is inversely related to the distance between the origin locations of the given sector and the identified sector, the computed interference score is inversely related to the degree to which the azimuth of the given sector points away from the origin location of the identified sector, and the computed interference score is inversely related to the degree to which the azimuth of the identified sector points away from the origin location of the given sector.

14. The method of claim 10, wherein computing the aggregate interference score for each given sector of the cell site further comprises, for each identified sector:

determining the degree to which the azimuth of the given sector points away from the origin location of the identified sector, as an angle between (i) the azimuth of the given sector and (ii) a line connecting the origin locations of the given sector and the identified sector; and determining the degree to which the azimuth of the identified sector points away from the origin location of the given sector, as an angle between (i) the azimuth of the identified sector and (ii) the line connecting the origin locations of the given sector and the identified sector.

15. The method of claim 14, wherein computing the aggregate interference score for each given sector of the cell site is further based on a distance between the origin location of the given sector and an origin location of a particular sector nearest to, but not co-located with, the given sector that has a different reference signal configuration than the given sector.

16. The method of claim 15, wherein computing the aggregate interference score for each given sector of the cell site further comprises identifying the particular sector based on (i) a comparison of the reference signal configuration of the particular sector with the reference signal configuration of the given sector and (ii) a comparison of the origin location of the particular sector with the origin location of the given sector.

17. The method of claim 15, wherein the computed interference score is directly related to the distance between the origin location of the given sector and the origin location of the particular sector.

18. The method of claim 10, wherein configuring reference-signal transmission in the sectors of the cell site in accordance with the determined permutation of the N reference signal configurations among the N sectors of the cell site comprises commanding a base station of the given sector to configuring the reference-signal transmission in the sectors of the cell site to provide the determined permutation of the N reference signal configurations among the N sectors of the cell site.

\* \* \* \* \*